United States Patent
Shin et al.

[11] Patent Number: 6,034,778
[45] Date of Patent: Mar. 7, 2000

[54] METHOD OF MEASURING SURFACE AREA VARIATION RATE OF A POLYSILICON FILM HAVING HEMISPHERICAL GRAINS, AND CAPACITANCE MEASURING METHOD AND APPARATUS BY THE SAME

[75] Inventors: Seung Woo Shin; Il Keoun Han; Sang Ho Woo; Hoon Jung Oh; Hong Seon Yang, all of Kyungki-Do, Rep. of Korea

[73] Assignee: Hyundai Electronics Industries, Kyungki-Do, Rep. of Korea

[21] Appl. No.: 09/298,053

[22] Filed: Apr. 22, 1999

[30] Foreign Application Priority Data

Apr. 22, 1998 [KR] Rep. of Korea .................. 98-14387

[51] Int. Cl.[7] ............................................. G01B 11/30
[52] U.S. Cl. ................................ 356/371; 356/445
[58] Field of Search ................................ 356/371, 381, 356/445, 446, 448, 237.1, 237.2; 938/398, 964; 257/309, 534

[56] References Cited

U.S. PATENT DOCUMENTS

| | | | |
|---|---|---|---|
| 5,087,121 | 2/1992 | Kakuchi et al. | 356/382 |
| 5,514,903 | 5/1996 | Inoue et al. | 257/618 |
| 5,623,243 | 4/1997 | Watanabe et al. | 257/309 |
| 5,691,249 | 11/1997 | Watanabe et al. | 437/233 |
| 5,731,213 | 3/1998 | Ono | 437/5 |
| 5,796,484 | 8/1998 | Honma et al. | 356/371 |
| 5,825,498 | 10/1998 | Thakur et al. | 356/394 |
| 5,835,225 | 11/1998 | Thakur | 356/381 |
| 5,837,578 | 11/1998 | Fan et al. | 438/254 |
| 5,850,288 | 12/1998 | Honma et al. | 356/371 |

FOREIGN PATENT DOCUMENTS

| | | |
|---|---|---|
| 55-18060 | 2/1980 | Japan . |
| 1-319674 | 12/1989 | Japan . |
| 3-221804 | 9/1991 | Japan . |
| 4-365375 | 12/1992 | Japan . |
| 8-254415 | 10/1996 | Japan . |
| 9-213602 | 8/1997 | Japan . |
| 9-298440 | 11/1997 | Japan . |

*Primary Examiner*—Hoa Q. Pham
*Attorney, Agent, or Firm*—Pennie & Edmonds LLP

[57] ABSTRACT

The present invention is a method which can obtain an actual value close to a desired capacitance of capacitor by precisely monitoring the area variation rate of film by using a correlation between a height of hemispherical grains formed on a surface of film and a surface area of film. The present invention provides a method of calculating an area variation rate '$C_E$' by using the porosity ratio '$f_v$' and the height 't' of hemispherical grains and measuring the capacitance of capacitor by using the obtained area variation rate. According to this method, the area variation rate of film can be obtained close to actual value by measuring the height of hemispherical grains formed on the surface of film, and the variation in capacitance before completion of capacitor can be precisely obtained. In addition, the present invention has effects of improving the reliability and manufacturing yield of capacitor by enabling the monitoring of area variation rate close to actual value in the step of forming the hemispherical grains on the surface of film.

22 Claims, 6 Drawing Sheets

METHOD OF MEASURING SURFACE AREA VARIATION RATE OF A POLYSILICON FILM HAVING HEMISPHERICAL GRAINS, AND CAPACITANCE MEASURING METHOD AND APPARATUS BY THE SAME

BACKGROUND OF THE INVENTION

1. Field of the Invention

The present invention relates to capacitor manufacturing technology field and, more particular, to a method of measuring surface area variation rate of a polysiticon film having hemispherical grains (HSG), and capacitance measuring method and apparatus by the same.

2. Information Disclosure Statement

High integration of semiconductor device is accelerated according to a development of technology. In particular, in case of DRAM memory device the high integration is intensified, and to form the high integration DRAM memory device, the number of capacitors to be integrated per unit area is increased and accordingly the area occupied by unit capacitor is decreased, therefore it is not easy to secure the capacitance of magnitude which can satisfy a drive characteristics of the device.

As solutions of such problems, various attempt have been made to increase the surface area by forming a capacitor of 3-Dimensional structure to secure a desired sufficient capacitance with small area.

As one of such methods, there is a method of increasing the surface area of capacitor by forming a HSG film on the surface of silicon film.

FIGS. 1a and 1b are sectional views showing an example of a conventional method of forming a HSG film on the surface of silicon film, which schematically show the formation of a spherical shape silicon grain or a hemispherical shape silicon grain 12 on the surface of silicon film 11 by using a gas of $SiH_4$ or $Si_2H_6$.

FIGS. 2a to 2c are sectional views showing other conventional example of forming the a HSG film on the surface of silicon film, which schematically show the formation of a spherical shape silicon grain or a hemispherical shape silicon grain 23 by depositing an amorphous silicon film 21 to be an electrode, absorbing a silicon atom 22 into the surface of amorphous silicon film 21, and moving silicon atom included in the amorphous silicon film 21 around the silicon atom 22 absorbed into the surface.

The capacitance 'C' is proportional to the area 'A' of capacitor as shown in Equation 1 below. In Equation 1, dielectric constant of a dielectric material is '∈' and thickness of the dielectric material is 'd' and surface area of capacitor is 'A'.

$$C = \frac{\varepsilon A}{d} \quad \text{[Equation 1]}$$

Therefore, at the time of forming the dielectric material of same material to an identical height, since the capacitance of capacitor is decided by the area 'A' of capacitor, it is very important to precisely monitor the surface area in case of forming the HSG film on the surface of silicon film as described above.

A conventional method of monitoring the surface of film is to irradiate a light having a predetermined wavelength on the surface of film, measure a phase difference of light, intensity of light, polarization variation rate, etc. of the light reflected from the surface of film, be provided with information on the surface of film such as height of film, reflection rate of film, deflection rate of film and porosity ratio of film, and to indirectly measure the surface area of film based on such information.

FIGS. 3a and 3b are a schematic view to illustrate a conventional method of monitoring the surface of film. As shown in FIG. 3a, the light incident from a light source 100 arrives at a semiconductor film 50 via a first lens 31, a reflection mirror 41 and a second lens 32, then is reflected at the semiconductor film 50, and is input to a signal processor 200 via the second lens 32, the reflection mirror 41, a third lens 33, a light polarizer 300 and a light collector 42. However, in the process of collecting the information on the film as described above, the information not only on the surface of film 50 but also on a lower stack film are transmitted. That is, taking as an example an incident light i incident toward the film 50 as shown in FIG. 3b, a light $r_1$ reflected at an indentation surface of the film 50, a light $r_2$ reflected at an interface between the indentation surface and a lower film and a light $r_3$ reflected at bottom surface of the lower film are together detected.

Therefore, the conventional method of indirectly measuring the area by irradiating the light having the predetermined wavelength to the surface of film and by measuring the phase difference, intensity and polarization variation rate, etc. of the light reflected from the surface of film has problems in that it has a significantly degraded precession and, furthermore, cannot monitor the result of process since it cannot obtain precise area.

SUMMARY OF THE INVENTION

Therefore, an object of the present invention is to provide a method of measuring a surface area variation rate which makes it possible to precisely obtain a surface area variation rate of a polysilicon film having hemispherical grains (HSG) by using the height and porosity ratio of the HSG film in a semiconductor device to solve the problems described above.

Other object of the present invention is to provide a method and an apparatus for monitoring in advance the capacitance prior to completion of capacitor by using the method of measuring the precise surface area variation rate as described above.

The present invention to accomplish the above described object provides a method of measuring a surface area of a polysilicon film having hemispherical grains in a semiconductor device comprising the steps of: a first step of forming a polysilicon film having hemispherical grains; a second step of obtaining a first constant 'Δ' and second constant 'α' from the Equation described below by measuring several times a height 't' of said hemispherical grains and a porosity ratio '$f_v$' of said hemispherical grains; and a third step of calculating an area variation rete '$C_E$' by substituting into the Equation described below the first constant 'Δ' and second constant 'α' obtained in the second step and the height 't' and porosity ratio '$f_v$' of said hemispherical grains.

$$C_E = 1 - \frac{3}{2}(1-f_V)\sin^2\theta + \frac{\sqrt{6\pi}}{a} \frac{t\sqrt{1-f_V}}{\sqrt{\exp(1-f_V)-1}} + \Delta \quad \text{[Equation]}$$

$$\left(\text{Here, } \theta = \cos^{-1}\left[1 - t\frac{\sqrt{2\pi}}{3a}\{(1-f_V)(\exp(1-f_V)-1\}^{1/2}\right]\right)$$

Wherein, 'α' and 'Δ' are constants.

The present invention to accomplish the above described object provides a method of measuring a capacitance of a capacitor using a polysilicon film having hemispherical grains as an electrode comprising the steps of: a first step of forming a polysilicon film having hemispherical grains; a second step of obtaining a first constant 'Δ' and second constant 'α' from the Equation 1 described below by measuring several times a height 't' of said hemispherical grains and a porosity ratio '$f_v$' of said hemispherical grains; a third step of calculating an area variation rate '$C_E$' by substituting into the Equation 1 described below the first constant 'Δ' and second constant 'α' obtained in the second step and the height 't' and porosity ratio '$f_v$' of said hemispherical grains; and a fourth step of calculating a capacitance variation rate '$C_r$' by substituting into the Equation 2 described below a thickness 'd' and dielectric constant '∈' of a dielectric film consisting a capacitor and said area variation rate $C_E$.

$$C_E = 1 - \frac{3}{2}(1 - f_V)\sin^2\theta + \frac{\sqrt{6\pi}}{a}\frac{t\sqrt{1 - f_V}}{\sqrt{\exp(1 - f_V) - 1}} + \Delta \quad \text{[Equation 1]}$$

$$\left(\text{Here, } \theta = \cos^{-1}\left[1 - t\frac{\sqrt{2\pi}}{3a}\{(1 - f_v)(\exp(1 - f_v) - 1\}^{1/2}\right]\right)$$

Wherein, 'α' and 'Δ' are constants.

$$C_r = \frac{\varepsilon C_E}{d} \quad \text{[Equation 2]}$$

In addition, the present invention to accomplish the above described object provides a method of measuring a surface area of a polysilicon film having hemispherical grains comprising the steps of: a first step of forming approximately a model of hemispherical grains on a polysilicon film to a sphere and a cylinder; a second step of calculating a volume of said hemispherical grains model and unit porosity ratio per predetermined unit volume; a third step of calculating an area variation rate by calculating a surface area of predetermined unit in case of having no said hemispherical grains model and a surface area of said hemispherical grains model; a fourth step of calculating a correlation between said unit porosity ratio calculated in the second step and said area variation rate calculated in the third step; a filth step of obtaining an average number '<N>' of said hemispherical grains models in predetermined area; a sixth step of calculating a correlation between a volume of said hemispherical grains model and said average number '<N>' by using a proportional the Equation described below and said volume of said hemispherical grains model to energy 'ΔE' absorbed at process temperature 'T'; and a seventh step of calculating a correlation between said porosity ratio and said area variation rate in a predetermined area from the correlation between said volume of said hemispherical grains models and said average number calculated in the sixth step and the correlation between said unit porosity ratio and said area variation rate calculated in the fourth step.

$$\langle N \rangle = \sum_N P_N N = \left[\sum_{j=1}^{\infty}\exp\left(\frac{-j\Delta E}{kT}\right)\right]^{-1}\sum_N \exp\left(-\frac{N\Delta E}{kT}\right)N = \quad \text{[Equation]}$$

$$-\frac{\partial}{\partial(\Delta E/kT)}\ln\left[\sum_N \exp\left(-\frac{N\Delta E}{kT}\right)\right] = \frac{1}{\exp(\Delta E/kT) - 1}$$

('$P_N$' is a probability that the number of hemispherical grains absorbing energy 'ΔE' is 'N')

In addition, the present invention to accomplish the above described object provides an apparatus for monitoring an area variation rate comprising: a means for forming a polysilicon film having hemispherical grains on a wafer; a means for measuring a height of said hemispherical grains and a porosity ratio of said hemispherical grains; and an operation processing means for calculating said area variation rate $C_E$ by substituting into the Equation described below the information about a height of said hemispherical grains and a porosity ratio of said hemispherical grains provided from said measurement means.

$$C_E = 1 - \frac{3}{2}(1 - f_V)\sin^2\theta + \frac{\sqrt{6\pi}}{a}\frac{t\sqrt{1 - f_V}}{\sqrt{\exp(1 - f_V) - 1}} + \Delta \quad \text{[Equation]}$$

$$\left(\text{Here, } \theta = \cos^{-1}\left[1 - t\frac{\sqrt{2\pi}}{3a}\{(1 - f_v)(\exp(1 - f_v) - 1\}^{1/2}\right]\right)$$

Wherein, 'α' and 'Δ' are constants.

BRIEF DESCRIPTION OF THE DRAWINGS

The above object and other advantages of the present invention will become more apparent by describing in detail the preferred embodiment of the present invention with reference to the attached drawings in which.

Similar reference characters refer to similar parts in the several views of the drawings.

DETAILED DESCRIPTION OF THE INVENTION

A preferred embodiment of the present invention will be described in detail below with reference to the accompanying drawings.

The present invention precisely measures the capacitance prior to completion of capacitor by precisely obtaining the variation rate of surface are a of film by using a correlation between the height of indentation formed on the surface of film, the volumetric ratio (porosity ratio) occupied by the apertures on the surface of film, and the surface are a of film having the hemispherical grains (HSG).

Figure 4A:
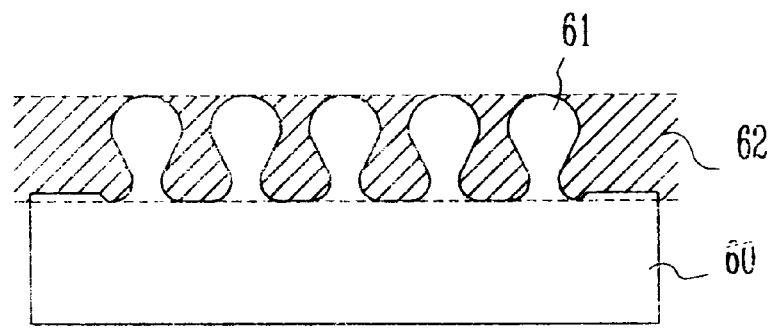
FIG. 4a is an exemplary sectional drawing to illustrate formation of HSG on silicon film in semiconductor device to which the present invention is applied.
Figure 4B:
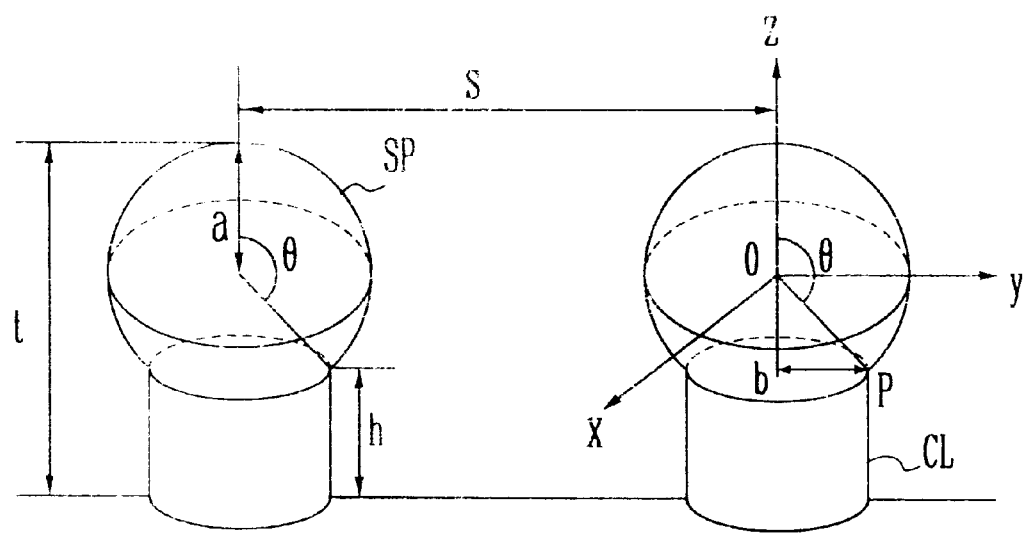
FIG. 4b is a schematic drawing to show the HSG as a model composed of a sphere and a cylinder.
Figure 4C:
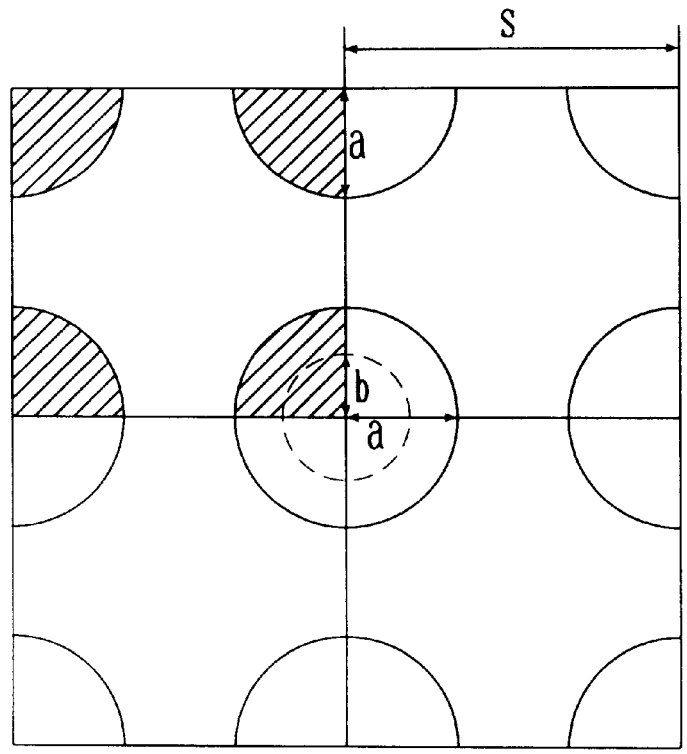
FIG. 4c is a top view of FIG. 4b.

FIG. 4a is an exemplary sectional drawing to illustrate formation of a HSG 61 on a silicon film 60, FIG. 4b shows the HSG 61 of FIG. 4a as a model composed of a sphere and a cylinder CL, and FIG. 4c is a top view of FIG. 4b. Reference number 62 represents a aperture, reference number t represents the height of HSG, reference number a represents the radius of sphere, reference number b represents the radius of cylinder, reference number θ represents the angle formed by a line OP and z-axis, reference number s represents a mean distance between HSG. The upper surface of cylinder CL is parallel to x-y plane, and the line OP connects the origin O and the point P on a circumference consisting the upper surface of the cylinder CL.

As shown in FIG. 4b, a section occupied by the cylinder and sphere forms the upper surface of cylinder in the model of HSG, and the circumference of upper surface of cylinder becomes a part of girth of sphere. That is, one section of sphere become the upper surface of cylinder so as to form a shape in which the cylinder and the section of sphere contact. Hereinafter, a sphere not a complete sphere but a part above the cylinder is called "partial sphere".

The radius b of cylinder CL and the radius a of sphere have the relation represented by the following Equation 2.

$$b = a \sin\theta, \ (0 < \theta < \Pi) \quad \text{[Equation 2]}$$

As shown in FIG. 4c, taking the average distance between adjoining HSG as s, since the height of HSG is 't', a unit volume becomes '$s^2 t$', and a unit porosity ratio '$f_v$' is represented by the following Equation 3.

$$fv = \frac{\text{unit volume} - \text{volume of } HSG}{\text{unit volume}} \quad \text{[Equation 3]}$$

As can be seen from FIG. 4c, one HSG exists in a unit volume. The volume '$f_m$' of one HSG is the sum of volume '$V_1$' of cylinder and volume '$V_2$' of partial sphere, and the volume '$V_1$' of cylinder is represented as the following Equation 4.

$$V_1 = \Pi a^2 \sin^2\theta h \quad \text{[Equation 4]}$$

Figure 5A:
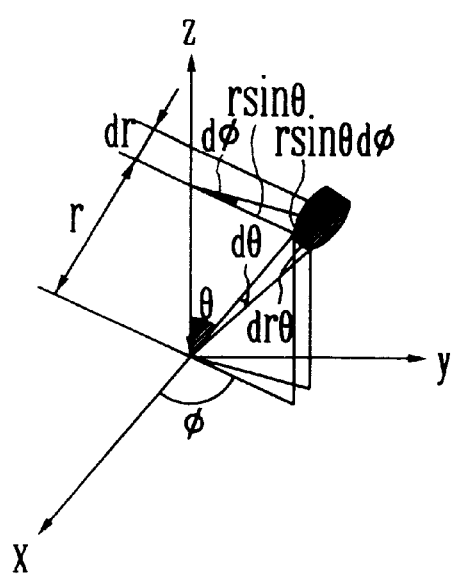
FIGS. 5a and 5b are drawings to illustrate a method of obtaining a volume and an area of a partial sphere according to the present invention.

The volume '$V_2$' of partial sphere SP is obtained by using spherical coordinate as shown in FIG. 5a since the unit volume '$V_u$' of sphere shown in FIG. 5a is $V_u = dr \cdot r \sin\theta d\phi \cdot rs\theta$, the volume '$V_2$' of partial sphere can be obtained by the following Equation 5 which integrates the unit volume of sphere about 'dr', 'dθ' and 'dφ'.

$$V_2 = \int_0^{2\pi} \int_0^{\theta} \int_0^{2a} r^2 \sin\theta \, dr \, d\theta \, d\Phi \quad \text{[Equation 5]}$$

Therefore, the volume '$f_m$' of the HSG can be defined as the following Equation 6 based on Equations 4 and 5.

$$fm = \quad \text{[Equation 6]}$$
$$V_1 + V_2 = \int_0^{2\pi} \int_0^{\theta} \int_0^{2a} r^2 \sin\theta \, dr \, d\theta \, d\Phi + \pi a^2 \sin^2\theta h$$

The unit porosity ratio '$f_v$' can be obtained by the following equation 7 obtained by introducing Equation 6 into Equation 3.

$$fv = \frac{1}{s^2 t}\left[s^2 t - \int_0^{2\pi}\int_0^{\theta}\int_0^{2a} r^2\sin\theta\, dr\, d\theta\, d\Phi - (\pi a^2 \sin^2\theta)h\right] \quad \text{[Equation 7]}$$
$$= 1 - \frac{1}{s^2 t}\int_0^{2\pi}\int_0^{\theta}\int_0^{2a} r^2\sin\theta\, dr\, d\theta\, d\Phi - \frac{1}{s^2 t}(\pi a^2 \sin^2\theta)h$$
$$= 1 - \frac{2\pi}{3}\frac{a^3}{s^2 t}(1 - \cos\theta) - \pi\frac{a^2 h}{s^2 t}\sin^2\theta$$

Figure 6:
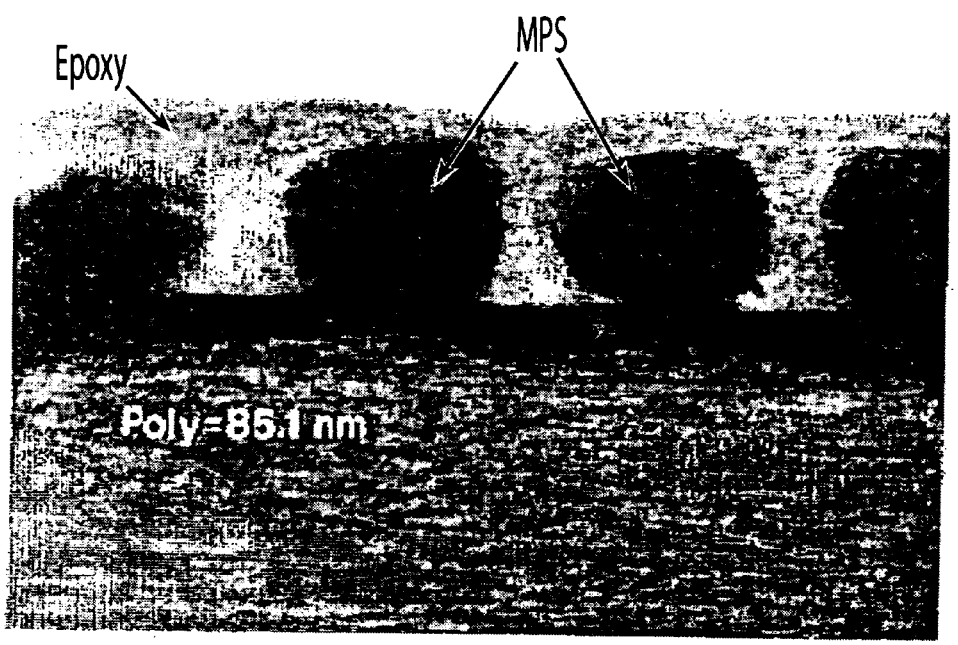
FIG. 6 is an exemplary TEM photograph to show an actual HSG shape to which the present invention is applied.
Figure 7:
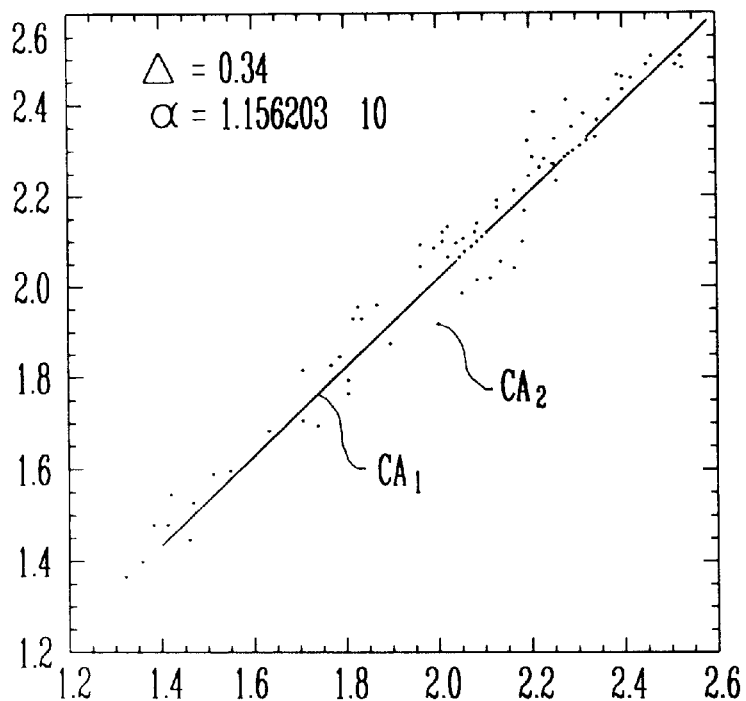
FIG. 7 is a graph showing a measured capacitance increase rate and a calculated capacitance increase rate.

FIG. 6 is a TEM photograph of a polysilicon film in which the HSG is grown, and as can be seen in FIG. 7, the height h of the cylinder CL established in the HSG model is very low, and accordingly the third term in Equation 7 can be neglected. Therefore, unit porosity ratio can be represented by Equation 8.

$$fv \ 1 - \frac{2\pi}{3}\frac{a^3}{s^2 t}(1 - \cos\theta) \quad \text{[Equation 8]}$$

In addition, when the height h of cylinder CL can be neglected, the height t of HSG is $t = d(1 - \cos\theta)$, the volume '$f_m$' of one HSG can be presented by Equation 9.

$$fm = 1 - fv = \frac{2\pi a^2}{3 s^2} \quad \text{[Equation 9]}$$

As can be seen in FIG. 4c, unit area '$s_i$' before formation of HSG is '$s^2$' and unit area '$s_f$' after formation of HSG is presented by Equation 10.

$s_f = s_i$–area of bottom surface of cylinder+surface area of partial sphere ($s_1$)+surface area of cylinder [Equation 10]

Figure 5B:
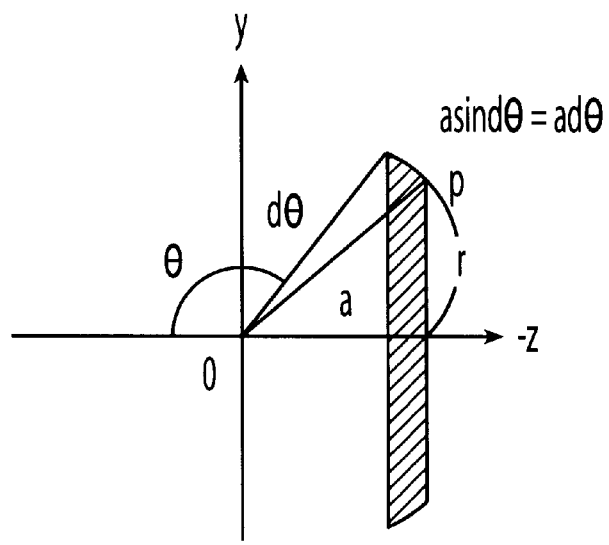

In the Equation 10, the area of bottom surface of cylinder is $\pi a^2 \sin\theta$ and the surface area of cylinder is $2\pi a \sin\theta h$. In FIG. 5b, since $r = a \sin(\pi - \theta) = a \sin\theta$, unit area '$s_u$' of partial sphere is presented by Equation 11.

$$s_u = 2\Pi \text{ rad } \theta = 2\Pi a^2 \sin\theta d\theta \quad \text{[Equation 11]}$$

Therefore, surface area '$s_1$' of partial sphere is presented by Equation 12.

$$s_1 = \int_0^{\theta} s_u \, d\theta = \quad \text{[Equation 12]}$$
$$\int_0^{\theta} 2\pi a^2 \sin\theta d\theta = 2\pi a^2 \int_0^{\theta} \sin\theta d\theta = 2\pi a^2(1 - \cos\theta)$$

The unit area '$s_f$' after formation of HSG can be arranged as Equation 13 by using the surface area '$s_1$' obtained by Equation 12.

$$s_f = si - \text{area of bottom of cylinder} + \quad \text{[Equation 13]}$$
$$\text{surface area of partial sphere } (s_1) +$$

surface area of cylinder $$= s^2 - \pi a^2 \sin^2\theta + 2\pi a^2(1 - \cos\theta) + 2\pi ah\sin\theta$$

An area variation rate '$C_E$' due to formation of HSG can be presented as Equation 14 by using Equation 8 and Equation 12.

$$C_E = \frac{s_f}{s_i} \qquad [\text{Equation 14}]$$

$$= \frac{1}{s^2}[s^2 - \pi a^2 \sin^2\theta + 2\pi a^2(1 - \cos\theta) + 2\pi ah\sin\theta]$$

$$= 1 - \pi \frac{a^2}{s^2}\sin^2\theta + 2\pi \frac{a^2}{s^2}(1 - \cos\theta) + 2\pi \frac{ah}{s^2}\sin\theta$$

$$\approx 1 - \frac{3}{2}f_m\sin^2\theta + \frac{3tf_m}{a} + \Delta$$

$$= 1 - \frac{3}{2}f_m\sin^2\theta + \sqrt{6}\,\pi t\frac{\sqrt{f_m}}{s} + \Delta$$

In Equation 14, '$\Delta$' is a first constant.

Assuming that the average number of HSG formed in 'A' area is '$\langle N \rangle$', the average distance 's' between unit HSG is statistically presented by Equation 15.

$$s = \sqrt{\frac{A}{\langle N \rangle}} \qquad [\text{Equation 15}]$$

Therefore, Equation 15 can be arranged as Equation 16 by substituting Equation 15 to Equation 14.

$$C_E = 1 - \frac{3}{2}f_m\sin^2\theta + \sqrt{6}\,\pi t\frac{\sqrt{f_m}}{\sqrt{A/\langle N \rangle}} + \Delta \qquad [\text{Equation 16}]$$

According to known statistical mechanics, a probability '$P_N$' that the number of HSG absorbing energy 'E' in HSG formation process is 'N' can be presented by Equation 17.

$$P_N = \left[\sum_{j=1}^{\infty}\exp\left(-\frac{j\Delta E}{kT}\right)\right]^{-1}\exp\left\{\frac{-N(E - E_o)}{kT}\right\} \qquad [\text{Equation 17}]$$

$$= \left[\sum_{j=1}^{\infty}\exp\left(-\frac{j\Delta E}{kT}\right)\right]^{-1}\exp - \left\{\frac{-N\Delta E}{kT}\right\}$$

In Equation 17, '$\Delta E$' is magnitude of energy absorbed by one HSG formed at process temperature 'T' ($\Delta E < kT$), '$E_o$' is threshold energy at which absorption of silicon atom to film surface starts, and 'k' is Boltzman constant.

From Equation 17, average number '$\langle N \rangle$' of HSG having predetermined energy state can be presented by Equation 18.

$$\langle N \rangle = \sum_N P_N N = \left[\sum_{j=1}^{\infty}\exp\left(\frac{-j\Delta E}{kT}\right)\right]^{-1} \qquad [\text{Equation 18}]$$

$$\sum_N \exp\left(-\frac{N\Delta E}{kT}\right)N$$

$$= -\frac{\partial}{\partial(\Delta E/kT)}\ln\left[\sum_N \exp\left(-\frac{N\Delta E}{kT}\right)\right]$$

$$= \frac{1}{\exp(\Delta E/kT) - 1}$$

In addition, since the volume '$f_m$' of one HSG is proportional to energy '$\Delta E$' absorbed at process temperature 'T' ($f_m \propto \Delta E/kT$), Equation 18 can be presented as Equation 19.

$$\langle N \rangle = \frac{r}{\exp(f_m) - 1} = \frac{r}{\exp(1 - f_v) - 1} \qquad [\text{Equation 19}]$$

In Equation 19, $\gamma$ is a proportional constant.

Substituting Equation 19 to Equation 16, the area variation rate '$C_E$' can eventually be presented by Equation 20.

$$C_E = 1 - \frac{3}{2}(f_m)\sin^2\theta + \frac{\sqrt{6\pi}}{a}t\frac{\sqrt{f_m}}{\sqrt{\exp(f_m) - 1}} + \Delta \qquad [\text{Equation 20}]$$

$$= 1 - \frac{3}{2}(1 - f_V)\sin^2\theta +$$

$$\frac{\sqrt{6\pi}}{a}\frac{t\sqrt{1 - f_V}}{\sqrt{\exp(1 - f_V) - 1}} + \Delta$$

$$\left(\text{Here,}\right.$$

$$\theta = \cos^{-1}\left[1 - t\frac{\sqrt{2\pi}}{3a}\{(1 - f_v)(\exp(1 - f_v) - 1\}^{1/2}\right]\right)$$

In Equation 20, '$\alpha$' represents a second constant.

The first constant '$\Delta$' and second constant '$\alpha$' are obtained as average values and used as constants by manufacturing the capacitor having as an electrode the film on which HSG is formed, measuring the capacitance by using a conventional LCR meter, measuring the height and porosity ratio of HSG by using conventional method, and establishing simultaneous equations having as variables the first constant '$\Delta$' and second constant '$\alpha$'. After obtaining the first constant '$\Delta$' and second constant '$\alpha$', the area variation rate of film to which HSG is formed can be calculated from Equation 20 by measuring with the conventional method the porosity ratio of film to which HSG is formed and the height of HSG.

Table is a data showing both of the variation rate of capacitance '$CA_1$' measured with LCR meter after completion of capacitor having as electrode the film to which the HSG is formed, and the variation rate of capacitance obtained by only forming HSG on the film, measuring the height 't' and porosity ratio '$f_v$' of HSG before completion of capacitor, and calculating the Equation 20 by substituting the measured values into equation 20. Only from FIG. 7 showing a preferred embodiment of the present invention in which the first constant '$\Delta$' and second constant '$\alpha$' are taken as 0.34 and 1.156203 * $10^6$, respectively, it can be easily seen that the capacitance '$CA_2$' calculated after formation only of HSG before completion of capacitor has linearity of order of 97% and is almost same as the capacitance '$CA_1$' measured with LCR meter after completion of capacitor. FIG. 7 showing with a graph the Table.

TABLE

| variation rate measured capacitance (CA₁) | height of HSG [Å] | porosity ratio of HSG | variation rate calculated capacitance (CA₂) | variation rate measured capacitance (CA₁) | height of HSG [Å] | porosity ratio of HSG | variation rate calculated capacitance (CA₂) |
|---|---|---|---|---|---|---|---|
| 1.48 | 290.4 | 0.010 | 1.35 | 2.18 | 393.5 | 0.582 | 2.07 |
| 1.49 | 282.9 | 0.120 | 1.45 | 2.18 | 467.0 | 0.465 | 2.12 |
| 1.52 | 303.0 | 0.120 | 1.47 | 2.18 | 390.9 | 0.598 | 2.29 |
| 1.53 | 290.4 | 0.200 | 1.54 | 2.20 | 397.9 | 0.593 | 2.27 |
| 1.56 | 302.1 | 0.260 | 1.61 | 2.20 | 465.0 | 0.478 | 2.13 |
| 1.58 | 313.9 | 0.260 | 1.43 | 2.20 | 451.5 | 0.505 | 2.00 |
| 1.59 | 320.3 | 0.260 | 1.57 | 2.21 | 469.7 | 0.475 | 2.12 |
| 1.61 | 335.4 | 0.260 | 1.57 | 2.21 | 395.4 | 0.602 | 2.21 |
| 1.64 | 324.7 | 0.325 | 1.67 | 2.23 | 405.6 | 0.593 | 2.40 |
| 1.65 | 330.6 | 0.325 | 1.61 | 2.23 | 403.8 | 0.597 | 2.29 |
| 1.77 | 381.5 | 0.345 | 1.85 | 2.24 | 404.8 | 0.597 | 2.34 |
| 1.89 | 400.0 | 0.420 | 1.95 | 2.25 | 408.8 | 0.599 | 2.30 |
| 1.89 | 39404 | 0.433 | 1.97 | 2.27 | 411.4 | 0.599 | 2.30 |
| 1.90 | 399.4 | 0.430 | 1.95 | 2.29 | 412.6 | 0.604 | 2.38 |
| 1.92 | 401.2 | 0.440 | 1.97 | 2.33 | 419.5 | 0.607 | 2.36 |
| 1.99 | 433.8 | 0.418 | 1.88 | 2.36 | 421.9 | 0.608 | 2.34 |
| 1.99 | 363.0 | 0.560 | 2.11 | 2.36 | 423.5 | 0.610 | 2.34 |
| 1.99 | 367.9 | 0.6584 | 1.92 | 2.36 | 421.3 | 0.614 | 2.41 |
| 2.01 | 439.2 | 0.426 | 2.10 | 2.37 | 424.1 | 0.613 | 2.37 |
| 2.05 | 439.2 | 0.426 | 2.10 | 2.39 | 428.6 | 0.611 | 2.36 |
| 2.05 | 455.1 | 0.415 | 2.06 | 2.39 | 427.9 | 0.614 | 2.38 |
| 2.09 | 443.3 | 0.465 | 2.13 | 2.41 | 432.8 | 0.611 | 2.40 |
| 2.10 | 391.7 | 0.584 | 2.15 | 2.44 | 435.1 | 0.617 | 2.42 |
| 2.10 | 395.9 | 0.567 | 2.25 | 2.45 | 442.1 | 0.609 | 2.51 |
| 2.11 | 394.5 | 0.581 | 2.14 | 2.46 | 438.0 | 0.619 | 2.45 |
| 2.11 | 392.3 | 0.567 | 2.04 | 2.47 | 441.6 | 0.614 | 2.48 |
| 2.11 | 392.5 | 0.567 | 2.15 | 2.50 | 443.6 | 0.621 | 2.45 |
| 2.11 | 379.1 | 0.592 | 2.21 | 2.51 | 444.7 | 0.621 | 2.52 |
| 2.11 | 379.4 | 0.591 | 2.22 | 2.51 | 449.7 | 0.815 | 2.47 |
| 2.12 | 462.0 | 0.460 | 2.13 | 2.61 | 444.6 | 0.822 | 2.50 |
| 2.12 | 451.4 | 0.486 | 2.14 | 2.61 | 448.3 | 0.618 | 2.49 |
| 2.13 | 444.4 | 0.483 | 1.97 | 2.62 | 447.8 | 0.820 | 2.51 |
| 2.14 | 390.4 | 0.582 | 2.03 | 2.60 | 461.5 | 0.821 | 2.52 |
| 2.14 | 448.6 | 0.480 | 1.97 | 2.62 | 484.5 | 0.823 | 2.52 |
| 2.15 | 388.8 | 0.596 | 2.25 | 2.64 | 468.7 | 0.822 | 2.53 |
| 2.16 | 468.3 | 0.455 | 2.08 | 2.64 | 488.0 | 0.824 | 2.55 |
| 2.17 | 445.1 | 0.500 | 1.99 | 2.65 | 469.2 | 0.824 | 2.51 |
| 2.17 | 401.9 | 0.577 | 2.20 | | | | |

Therefor, by substituting the measured height h and porosity ratio '$f_v$' of HSG into Equation 20, the capacitance can be monitored at the step of formation of film consisting an electrode of capacitor.

Figure 8:
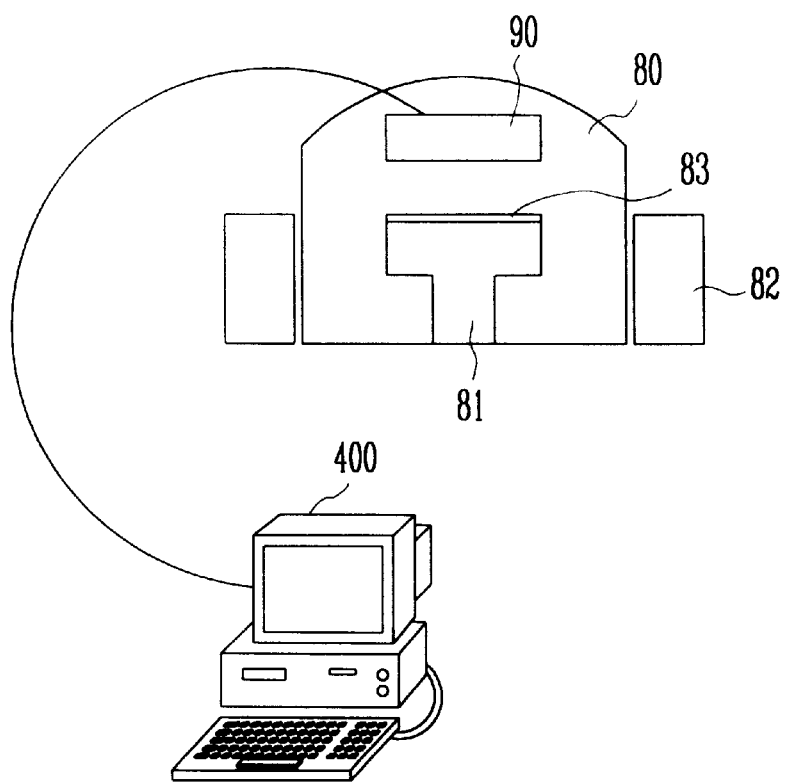
FIG. 8 is a schematic drawing showing an example of structure of an apparatus for monitoring the area variation rate according to the present invention.

FIG. 8 is a schematic drawing of an apparatus for monitoring the area variation rate according to an embodiment of the present invention. The capacitance variation can be measured close to real value in the step of forming the HSG on the surface of film by providing an apparatus 90 for measuring the height and the porosity ratio of HSG film in a film formation chamber 80 as shown in FIG. 8, and by obtaining the area variation rate by substituting the measured value of height and porosity ratio of the HSG into equation 20.

That is, the height and the porosity ratio of the HSG formed on film are measured by using the apparatus 90 for measuring the height and the porosity ratio of HSG film provided in the chamber 80 in the process of mounting a wafer 83 on a wafer support 81 provided in the chamber 80, applying heat to the chamber 80 and the wafer 83 by using a heater 82 provided inside or outside the chamber 80, and forming the film on the wafer 83 by introducing a predetermined gas for formation of HSG film into the chamber 80. The informations about the measured height and porosity ratio of HSG is supplied to an operation processor 400 through a supply (not shown) built in the operation processor 400 or coupled to the apparatus 90 for measuring the height and the porosity ratio, and are added to the equation for calculation of area variation rate and the equation for calculation of capacitance of indented film through the operation processor 400 by using the Equation 1 and Equation 20.

Figure 1A:
FIGS. 1a and 1b are sectional views to schematically show an example of a conventional method of forming a HSG film on surface of silicon film.
Figure 1B:
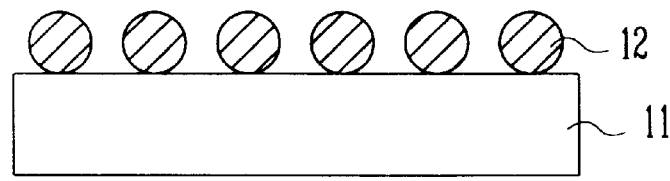
Figure 2A:
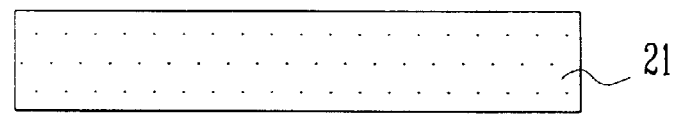
FIGS. 2a to 2c are sectional views to schematically show other example of the conventional method of forming a HSG film on surface of silicon film.
Figure 2B:
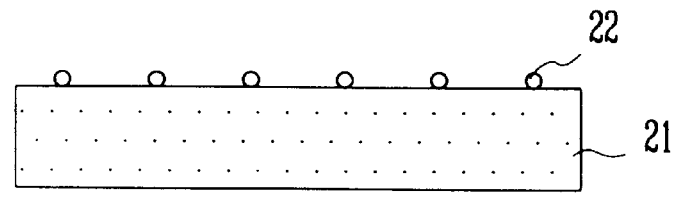
Figure 2C:
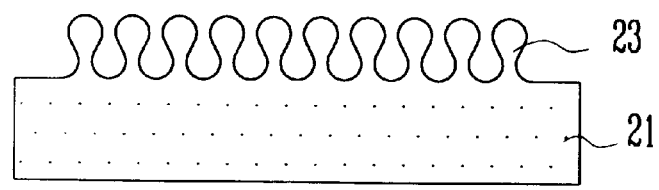
Figure 3A:
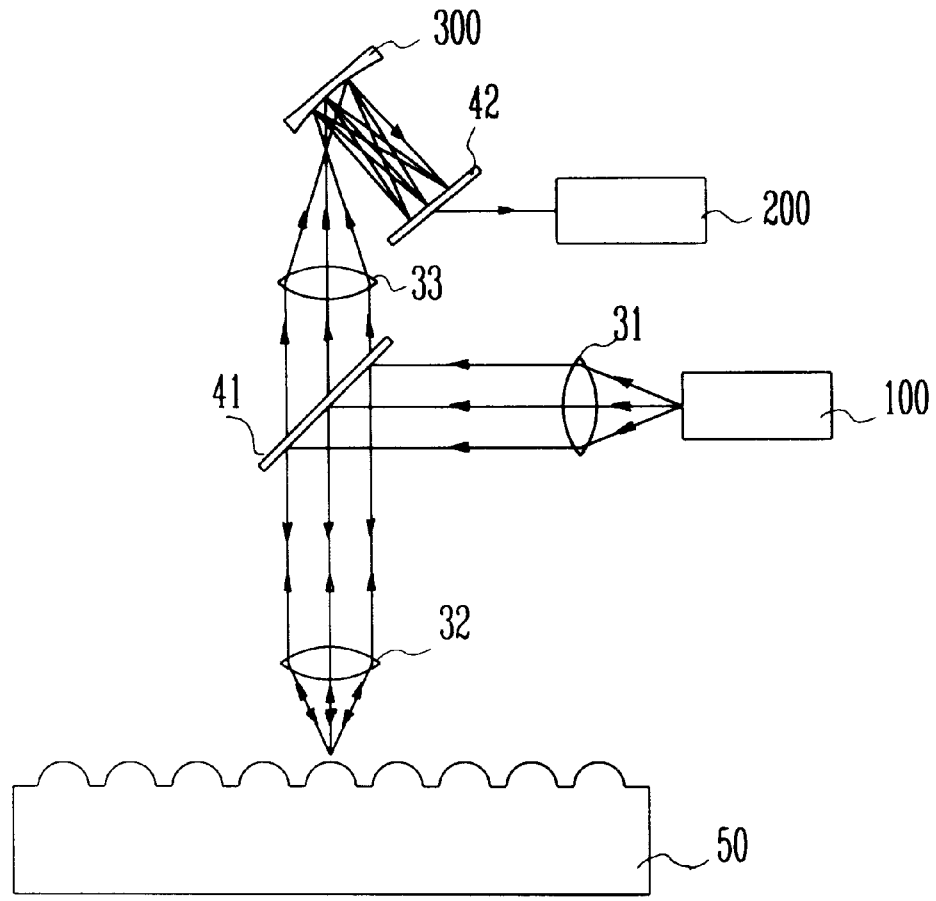
FIGS. 3a and 3b are schematic drawings to illustrate a conventional method of monitoring the surface of film.
Figure 3B:
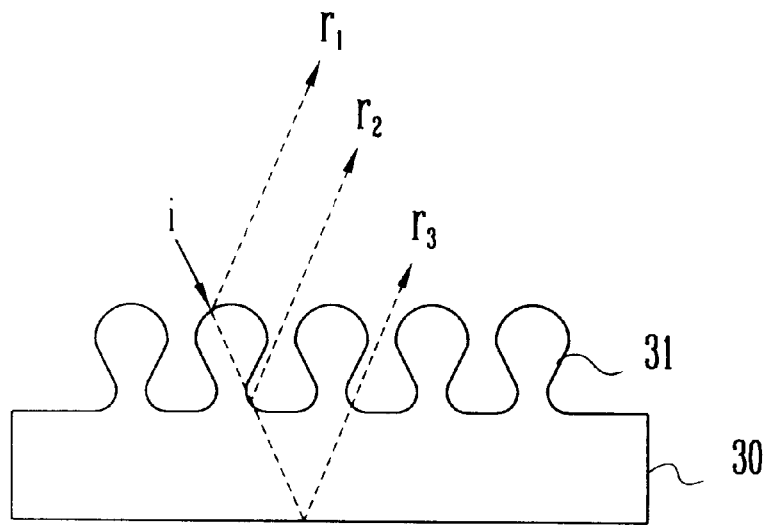

The apparatus 90 for measuring the height and the porosity ratio of HSG film comprises the construction shown in FIG. 3a. That is, the apparatus 90 for measuring the height and the porosity ratio of HSG film obtains the height and the porosity ratio of HSG film by irradiating the light onto film formed or being formed on the wafer, and processing the light reflected from the film into an electric signal. In addition, the apparatus 90 for measuring the height and the porosity ratio of HSG film is connected to or internally comprises the supply (not shown) so as to provide the informations about the measured height and porosity ratio of film to the operation processor 400 connected to the supply. The operation processor 400 can be easily constructed from a microprocessor such as known CPU, etc.

The area variation rate '$C_E$' is calculated by substituting into the operation processor 400 the height and the porosity ratio of HSG film provided from the apparatus 90 for measuring the height and the porosity ratio of HSG film, and the first constant 'Δ' and second constant 'α' measured in advance with the method described above, then the capacitance is calculated from the calculated area variation rate '$C_E$' nd Equation 1.

The present invention described above is not limited to the embodiment of the present invention and the accompanying drawings, and it will be obvious to one having ordinary knowledge in the art to which the present invention belongs that various substitutions, variations and alterations are possible without departing the technical thoughts of the present invention.

The present invention described above can precisely obtain the variation in capacitance before completion of capacitor by providing the method which can obtain the area variation rate close to real value by being provided with the height and the porosity ratio of HSG formed at the surface of film. In addition, the present invention has the effect of improving the reliability and manufacturing yield of capacitor by monitoring the area variation rate close to real value at the step of forming the HSG at the surface of film.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. A method of measuring a surface area of a polysilicon film having hemispherical grains in a semiconductor device comprising the steps of:

a first step of forming a polysilicon film having hemispherical grains;

a second step of obtaining a first constant '$\Delta$' and second constant '$\alpha$' from the equation described below by measuring several times a height 't' of said hemispherical grains and a porosity ratio '$f_v$' of said hemispherical grains; and a third step of calculating an area variation rate '$C_E$' by substituting into the equation described below the first constant '$\Delta$' and second constant '$\alpha$' obtained in the second step and the height 't' and porosity ratio '$f_v$' of said hemispherical grains;

$$C_E = 1 - \frac{3}{2}(1 - f_V)\sin^2\theta + \frac{\sqrt{6\Pi}}{a}t\sqrt{1} - \frac{f_V}{\sqrt{\exp(1 - f_V) - 1}} + \Delta \quad \text{(equation)}$$

$$\left(\text{Here, } \theta = \cos^{-1}\left[1 - t\frac{\sqrt{2\Pi}}{3a}\{(1 - f_V)(\exp(1 - f_v) - 1\}^{1/2}\right]\right)$$

wherein, '$\alpha$' and '$\Delta$' are constants.

2. The method of claim 1, wherein said polysilicon film having hemispherical grains in the first step is a film being deposited on a wafer.

3. The method of claim 2, wherein said hemispherical grains have a shape composed of a sphere and a cylinder.

4. The method of claim 3, wherein said hemispherical grains have a shape in which one section of a sphere becomes top surface of cylinder so that the cylinder and the section of the sphere contact each other.

5. The method of claim 4, wherein the center of said sphere is at the origin of a rectangular coordinate system, the upper surface of said cylinder is parallel to x-y plane, and said '$\theta$' is an angle which is composed by a line connecting said origin and a point on a circumference composing said upper surface of cylinder and z-axis.

6. The method of claim 3, wherein height of said cylinder is so small as to be negligible.

7. The method of claim 1, wherein said first constant value is substantially 0.3 and said second constant value is substantially $1.156203*10^6$.

8. A method of measuring a capacitance of a capacitor using a polysilicon film having hemispherical grains as an electrode comprising the steps of:

a first step of forming a polysilicon film having hemispherical grains;

a second step of obtaining a first constant '$\Delta$' and second constant '$\alpha$' from the equation 1 described below by measuring several times a height 't' of said hemispherical grains and a porosity ratio '$f_v$' of said hemispherical grains;

a third step of calculating an area variation rate '$C_E$' by substituting into the equation 1 described below the first constant '$\Delta$' and second constant '$\alpha$' obtained in the second step and the height 't' and porosity ratio '$f_v$' of said hemispherical grains; and a fourth step of calculating a capacitance variation rate '$C_r$' by substituting into the equation 2 described below a thickness 'd' and dielectric constant '$\in$' of a dielectric film consisting a capacitor and said area variation rate $C_E$;

$$C_E = 1 - \frac{3}{2}(1 - f_V)\sin^2\theta + \frac{\sqrt{6\pi}}{a}t\sqrt{1} - \frac{f_V}{\sqrt{\exp(1 - f_V) - 1}} + \Delta \quad \text{(equation 1)}$$

$$\text{Here, } \theta = \cos^{-1}\left[1 - t\frac{\sqrt{2\pi}}{3a}\{(1 - f_v)(\exp(1 - f_v) - 1\}^{1/2}\right]$$

wherein, '$\alpha$' and '$\Delta$' are constants;

$$C_r = \frac{\varepsilon C_E}{d}. \quad \text{(equation 2)}$$

9. The method of claim 8, wherein said polysilicon film having hemispherical grains in the first step is a film being deposited on a wafer.

10. The method of claim 9, wherein said first constant value is substantially 0.3 and said second constant value is substantially $1.156203*10^6$.

11. The method of claim 8, wherein said hemispherical grains have a shape composed of a sphere and a cylinder.

12. The method of claim 11, wherein said hemispherical grains have a shape in which one section of a sphere becomes top surface of cylinder so that the cylinder and the section of the sphere contact each other.

13. The method of claim 12, wherein height of said cylinder is so small as to be negligible.

14. The method of claim 11, wherein the center of said sphere is at the origin of a rectangular coordinate system, the upper surface of said cylinder is parallel to x-y plane, and said '$\theta$' is an angle which is composed by a line connecting said origin and a point on a circumference composing said upper surface of cylinder and z-axis.

15. A method of measuring a surface area of a polysilicon film having hemispherical grains comprising the steps of:

a first step of forming approximately a model of hemispherical grains on a polysilicon film to a sphere and a cylinder;

a second step of calculating a volume of said hemispherical grains model and unit porosity ratio per predetermined unit volume;

a third step of calculating an area variation rate by calculating a surface area of predetermined unit in case of having no said hemispherical grains model and a surface area of said hemispherical grains model;

a fourth step of calculating a correlation between said unit porosity ratio calculated in the second step and said area variation rate calculated in the third step;

a fifth step of obtaining an average number '<N>' of said hemispherical grains models in predetermined area;

a sixth step of calculating a correlation between a volume of said hemispherical grains model and said average number '<N>' by using a proportional the equation described below and said volume of said hemispherical grains model to energy 'ΔE' absorbed at process temperature 'T'; and a seventh step of calculating a correlation between said porosity ratio and said area variation rate in a predetermined area from the correlation between said volume of said hemispherical grains models and said average number calculated in the sixth step and the correlation between said unit porosity ratio and said area variation rate calculated in the fourth step;

$$\langle N \rangle = \sum_N P_N N = \left[\sum_{j=1}^{\infty} \exp\left(\frac{-j\Delta E}{kT}\right)\right]^{-1} \sum_N \exp\left(-\frac{N\Delta E}{kT}\right) N \quad \text{(equation)}$$

$$= -\frac{\partial}{\partial(\Delta E/kT)} \ln\left[\sum_N \exp\left(-\frac{N\Delta E}{kT}\right)\right]$$

$$= \frac{1}{\exp(\Delta E/kT) - 1}$$

('$P_N$' is a probability that the number of hemispherical grains absorbing energy 'ΔE' is 'N').

16. The method of claim 15, wherein said hemispherical grains have a shape composed of a sphere and a cylinder.

17. The method of claim 15, wherein said hemispherical grains have a shape in which one section of a sphere becomes top surface of cylinder so that the cylinder and the section of the sphere contact each other.

18. The method of claim 17, wherein the center of said sphere is at the origin of a rectangular coordinate system, the upper surface of said cylinder is parallel to x-y plane, and said 'θ' is an angle which is composed by a line connecting said origin and a point on a circumference composing said upper surface of cylinder and z-axis.

19. The method of claim 18, wherein height of said cylinder is so small as to be negligible.

20. An apparatus for monitoring an area variation rate comprising:

a means for forming a polysilicon film having hemispherical grains on a wafer;

a means for measuring a height of said hemispherical grains and a porosity ratio of said hemispherical grains; and an operation processing means for calculating said area variation rate $C_E$ by substituting into the equation described below the informations about a height of said hemispherical grains and a porosity ratio of said hemispherical grains provided from said measurement means;

$$C_E = 1 - \frac{3}{2}(1 - f_V)\sin^2\theta + \quad \text{(equation)}$$
$$\frac{\sqrt{6\Pi}}{a}t\sqrt{1} - \frac{f_V}{\sqrt{\exp(1 - f_V) - 1}} + \Delta$$

$$\left(\text{Here,}\right.$$

$$\theta = \cos^{-1}[1 - t\frac{\sqrt{2\Pi}}{3a}\{(1 - f_V)(\exp(1 - f_V) - 1\}^{1/2}]\right)$$

wherein, 'α' and 'Δ' are constants.

21. The apparatus of claim 20, wherein said polysilicon film having hemispherical grains is a film completely formed on a wafer.

22. The apparatus of claim 20, wherein said means for measuring a height of said hemispherical grains and a porosity ratio of said hemispherical grains measures the height of said hemispherical grains and the porosity ratio of said hemispherical grains by irradiating a light on said wafer and processing the light reflected from said wafer into an electric signal.

* * * * *